Patented Oct. 20, 1953

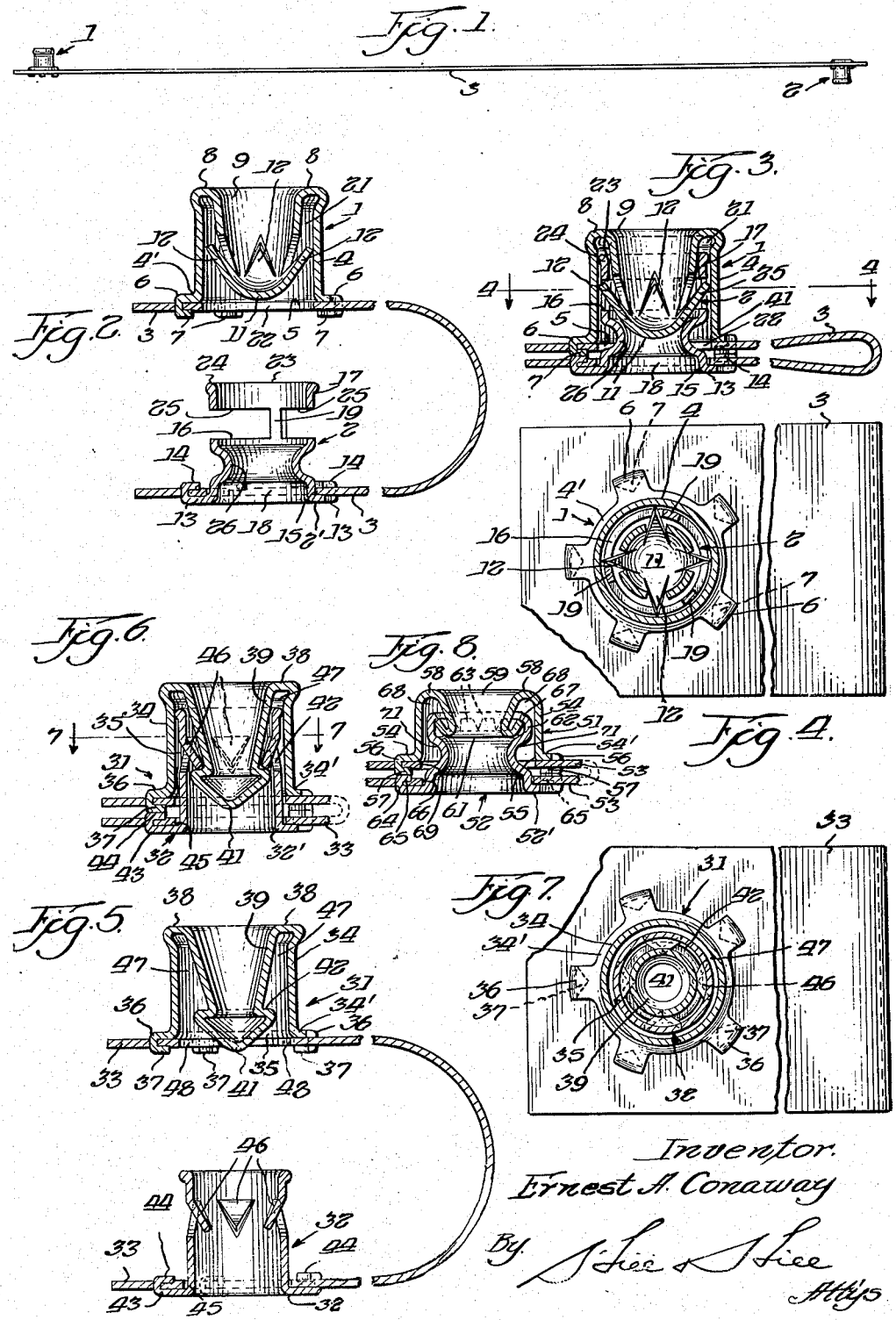

2,656,209

UNITED STATES PATENT OFFICE 2,656,209

SNAP STRAP SEAL

Ernest A. Conaway, Sr., Chicago, Ill., assignor to Ernest A. Conaway, Jr., Brooklyn, N. Y., Dorothea Conaway Jennings, Lake Wales, Fla., and Patricia Conaway Miller, Oak Park, Ill.

Application December 31, 1949, Serial No. 136,229

10 Claims. (Cl. 292—319)

The invention relates generally to snap fasteners, and more particularly to a fastener adapted to permanently lock two members together, whereby separation of the members is prevented, other than by destruction of the fastener.

The invention is particularly adapted for use with straps of paper, or other material, for use as baggage tags, freight seals, or the like, whereby the tag or seal cannot be removed except by destruction of the strap or fastener.

The invention has among its objects the production of such a fastener which is very simple in construction, requiring only two pieces or elements, which fastener may be readily and inexpensively manufactured, and is very efficient and durable in use.

Another object of the invention is the production of such a fastener which is tamper-proof, requiring destruction of the device to effect separation of the elements, but which may be easily and quickly locked to provide a positive connection.

A further object of the invention is the production of such a fastener in which the members carrying the elements of the fastener may be closely positioned adjacent one another when the fastener is in locking relationship, at the same time permitting one of the fasteners to pass through both of the members.

Many other objects and advantages of the construction herein shown and described will be obvious to those skilled in the art from the disclosure herein given.

To this end my invention consists in the novel construction, arrangement, and combination of parts herein shown and described, and more particularly pointed out in the claims.

In the drawings, wherein like reference characters indicate like or corresponding parts:

Fig. 1 is a side elevational view of a strap having a pair of co-operable fastening elements secured thereto adjacent respective ends of the strap;

Fig. 2 is a longitudinal, sectional view through the co-operating elements of the fastener, with the latter shown in separated position;

Fig. 3 is a view similar to Fig. 2, with the elements in locked position;

Fig. 4 is a transverse, sectional view through the locked elements taken approximately on the line 4—4 of Fig. 3;

Fig. 5 is a longitudinal, sectional view similar to Fig. 2 of a modified form of the invention;

Fig. 6 is a sectional view similar to Fig. 3 of the fastener illustrated in Fig. 5;

Fig. 7 is a transverse, sectional view similar to Fig. 4 taken approximately on the line 7—7 of Fig. 6; and Fig. 8 is a sectional view similar to Figs. 3 and 6 of another modification of the invention.

The present invention contemplates the use of a pair of co-operable members adapted to nest together, and provided with co-operable interlocking portions whereby the members are permanently secured together, the male member being generally tubular in shape and adapted to be inserted into the female member between spaced walls of the latter, whereby the co-operable interlocking elements are positioned in the annular space between adjacent walls of the female member, so that the interlocking elements are effectively protected from tampering, etc., and cannot be separated without destruction of the fastener.

Referring to the drawings, and particularly to Figs. 1 to 4, the numeral 1 indicates generally a female fastener member, and 2 a co-operable male fastener member, each of which is mounted on an elongated strap 3 of paper, or other suitable material, adjacent respective ends of the latter. As illustrated in Fig. 2, the female member 1 is provided with a tubular outer wall or shell 4 open at the end 5 and having an outwardly extending flange 4' adjacent the open end of the shell 4 from which a plurality of tongues or prongs 6 project, the tongues being adapted to be inserted through the strap 3 and crimped over, as indicated at 7, to securely connect the member 1 to the strap.

Integrally connected with the shell 4, as indicated at 8, at the end of the shell, opposite the open end 5, is a concentrically positioned tubular member or sleeve 9, the inner end of which, in the construction illustrated in Figs. 1 to 5, is closed, as indicated at 11. The shell 4 and sleeve 9 may be suitably formed from a single piece of material by stamping, drawing, or other operations. Cut from the side walls of the sleeve 9 are a plurality of locking fingers or tongues 12, the latter, in the embodiment of the invention illustrated, being triangular in shape and spaced apart ninety degrees with respect to the axis of the member, with the tongues extending generally toward the connecting portion 8 between the shell 4 and sleeve 9.

The male member 2 is likewise tubular in shape, open at both ends, and provided at one end with an outwardly extending flange 2' having tongues or prongs 13, similar to the prongs 6, which are inserted through the adjacent end of the strap 3 and crimped over, as indicated at 14, thus securing the male member to the strap, with the member 2 extending through an opening 15 in the latter. The side walls of the member 2 are provided with a plurality of peripherally extending, elongated openings 16, the embodiment of the invention illustrated containing three such openings uniformly positioned with respect to the axis of the member to divide the latter into an upper portion 17, and a lower portion 18 connected by the columns 19.

In locking the elements together, the male member 2 is inserted into the annular space 21 between the shell 4 and sleeve 9, the strap adjacent the member 1 being provided with an opening 22 of a size to permit passage of the member 2 therethrough, as illustrated in Fig. 3. As the member 2 is inserted in the member 1, the upper free end 23 of the male member will engage the tongues 12 and urge the free ends of the latter inwardly toward the axis of the device, the end edge 23 of the member 2, if desired, being flared outwardly slightly, as indicated at 24, to facilitate such action. Insertion of the member 2 into the member 1 is continued until the free ends of the fingers or tongues 12 are positioned below the upper edges 25 of the respective openings 16. The member 1 is constructed of a suitable material having sufficient inherent resiliency to cause the tongues 12 to spring outwardly into the openings 16, and substantially resume their original positions, whereby upon any withdrawal movement of the male member, the tongues will engage the upper edges 25 of the openings 16 and prevent further withdrawal of the member 2 from the member 1. It will be noted that the edges 25, in effect, form a ledge or abutment engageable with the prongs and co-operable therewith to interlock the two members together. As the member 1, in the embodiment of the invention illustrated, is provided with four tongues 12, and the member 2 with three openings 16, it will be apparent from a reference to Fig. 4 that at least three of the tongues will be interlocked with the member 2 at all times, as it is possible to have only one of the tongues aligned with one of the columns 19. It will also be noted that, as the interlocking elements of the members 1 and 2 are positioned in the annular space 21 between the shell 4 and sleeve 9, such elements are effectively protected against possible tampering therewith. However, if desired, the member 2 may readily be provided with an internal peripheral bead 26, or the like, adapted to be positioned closely adjacent to the inner end of the sleeve 9 when the members 1 and 2 are interlocked, thereby providing still further protection against the insertion of a tool, or other element, between the sleeve 9 and member 2 in an effort to disengage the tongues 12 from the male member. Obviously, it would be impossible to move the tongues 12 toward the axis of the fastener by means of a tool, or the like, inserted in the sleeve 9.

It will also be noted that when the members are interlocked, as illustrated in Fig. 3, the ends of the strap 3 are positioned closely adjacent to one another, with the member 2 extending through the openings 15 and 22 in the respective ends of the strap, with the ends 7 and 14 of the prongs 6 and 13 positioned opposite one another between the adjacent ends of the strap. Thus the fastening means of the respective members to the strap ends function merely to retain the members on such ends prior to the interlocking thereof, and once the two members have been interlocked, the separation of the respective strap ends from the members is prevented by such interlocking, as it would be necessary to tear the strap adjacent the holes 15 and 22 before the same can be separated.

The modification illustrated in Figs. 5 to 7 in general is similar to that heretofore described, with the exception that the locking elements are reversed, the tongues being carried by the male member, and the female member being provided with a suitable shoulder or ledge engageable with the tongues for interlocking the members together.

Referring to Figs. 5 to 7, the numeral 31 indicates generally a female fastener member corresponding to the member 1, and 32 a co-operable male fastener member corresponding to the member 2. The female member 31 is provided with a tubular outer wall or shell 34 open at the end 35 and having an outwardly extending flange 34' adjacent the open end of the shell 34 from which a plurality of tongues or prongs 36 project, the tongues being adapted to be inserted through the strap 33 and clamped over, as indicated at 37, to securely connect the member 31 to the strap.

Integrally connected with the shell 34, as indicated at 38, at the end of the shell opposite the open end 35, is a concentrically positioned tubular member or sleeve 39, the inner end of which is closed, as indicated at 41. The shell 34 and sleeve 39 may be suitably formed from a single piece of material by stamping, drawing, or other operations. The member 39 adjacent the closed end 41 thereof is outwardly offset to form a peripheral shoulder or ledge 42.

The male member 32 is likewise tubular in shape, open at both ends, and provided at one end with an outwardly extending flange 32' having tongues or prongs 43, similar to the prongs 36, which are inserted through the adjacent end of the strap 33 and crimped over, as indicated at 44, thus securing the male member to the strap, with the member 32 extending through an opening 45 in the latter. Cut from the side walls of the member 32 are a plurality of locking fingers or tongues 46, the embodiment of the invention illustrated containing four such tongues uniformly positioned with respect to the axis of the member, the tongues being triangular in shape and extending inwardly toward the end of the member 32 adjacent the strap 33.

In locking the elements together, the male member 32 is inserted into the annular space 47 between the shell 34 and sleeve 39, the strap adjacent the member 31 being provided with an opening 48 of a size to permit passage of the member 2 therethrough, as illustrated in Fig. 6. As the member 32 is inserted in the member 31, the tongues 46 will engage the lower end of the sleeve 39 adjacent the shoulder 42, and thereby urge the free ends of the tongues outwardly away from the axis of the device, the end portion 41 of the member 2 being more or less conical in shape to facilitate such movement of the tongues 46. Insertion of the member 32 into the member 31 is continued until the free ends of the tongues 46 are positioned above the ledge 42 on the sleeve 39. The member 31 is also constructed of a suitable material having sufficient inherent resiliency to cause the tongues 46 to spring inwardly and substantially resume their original positions and overlie the ledge 42, whereby upon any withdrawal movement of the male member, the tongues will engage the ledge 42 and prevent further withdrawal of the member 32 from the member 31. It will be noted, as in the previous form, that as the interlocking elements of the members 31 and 32 are positioned in the annular space 47 between the shell 34 and sleeve 39, such elements are effectively protected against possible tampering therewith. Obviously, it would be impossible to move the tongues 46 toward the axis of the fastener by means of a tool, or the like, attempted to be inserted between the member 32 and sleeve 39.

It will also be noted that, as in the first form, when the members are interlocked, as illustrated in Fig. 6, the ends of the strap 33 are positioned closely adjacent to one another, with the member 32 extending through the openings 45 and 48 in the respective ends of the strap, with the ends 37 and 44 of the prongs 36 and 43 positioned opposite one another between the adjacent ends of the strap.

In the construction illustrated in Fig. 8, the numeral 51 indicates generally a female fastener member, and 52 a cooperable male fastener member, each of which is mounted on the respective ends of a strap 53. The female member 51 is provided with a tubular outer wall or shell 54 open at the end 55 and having an outwardly extending flange 54' adjacent the open end of the shell 54 from which a plurality of tongues or prongs 56 project, the tongues being adapted to be inserted through the strap 53 and crimped over, as indicated at 57, to securely connect the member 51 to the strap.

Integrally connected with the shell 54, as indicated at 58, at the end of the latter, opposite the open end 55, is a concentrically positioned tubular member or sleeve 59. The shell 54 and sleeve 59 may be suitably formed from a single piece of material by stamping, drawing, or other operations. Extending upwardly and radially outwardly from the side walls of the sleeve 59, at the inner end 61, is a serrated flange, indicated generally by the numeral 62, and, in effect, providing a plurality of locking fingers or tongues 63, with the tongues extending generally toward the connecting portion 58 between the shell 54 and sleeve 59.

The male member 52 is likewise tubular in shape, open at both ends, and provided at one end with an outwardly extending flange 52' having tongues or prongs 64 similar to the prongs 36, which are inserted through the adjacent end of the strap 53 and crimped over, as indicated at 65, thus securing the male member to the strap, with the member 52 extending through an opening 66 in the latter, and the free end of the member is provided with an inwardly extending, peripheral flange or shoulder 67.

In locking the elements together, the male member 52 is inserted into the annular space 68 between the shell 54 and sleeve 59, the strap adjacent the member 51 being provided with an opening 69 of a size to permit passage of the member 52 therethrough, as illustrated. As the member 52 is inserted in the member 51, the upper flanged end 67 of the male member will engage the tongues 63 and urge the free ends of the latter inwardly toward the axis of the device, the end edge of the member 52, if desired, being rounded slightly to facilitate such movement of the tongues 63. Insertion of the member 52 into the member 51 is continued until the flange 67 is positioned above the tongues 63. The member 1 is constructed of a suitable material having sufficient inherent resiliency to cause the tongues 63 to spring outwardly below the flange 67 and substantially resume their original positions, whereby upon any withdrawal movement of the male member, the tongues will engage the inner face of the flange 67 and prevent further withdrawal of the member 52 from the member 51. It will be noted that the flange 67 likewise, in effect, forms a ledge or abutment engageable with the prongs and co-operable therewith to interlock the two members together. It will also be noted, as in the previous forms, that as the interlocking elements of the members 51 and 52 are positioned in the annular space 68 between the shell 54 and sleeve 59, such elements are effectively protected against possible tampering therewith. However, to afford additional protection, the member 2 may be provided with an internal peripheral bead 71, or the like, adapted to be positioned closely adjacent to the inner end of the sleeve 59 when the members 51 and 52 are interlocked, thereby completely preventing the insertion of a tool, or other element, between the sleeve 59 and member 52 in an effort to disengage the tongues 63 from the male member.

It will further be noted that, as in the previous forms, when the members are interlocked, as illustrated in Fig. 8, the ends of the strap 53 are positioned closely adjacent to one another, with the member 52 extending through the openings 66 and 69 in the respective ends of the strap, with the ends 57 and 65 of the prongs 56 and 64 positioned opposite one another between the adjacent ends of the strap.

It will be apparent from the above description that, in all of the forms described, when the members are interlocked, the tubular male member is positioned in an annularly-shaped recess formed in the female member, with the interlocking elements on the two members being positioned in such recess, so that such interlocking elements are effectively shielded and protected from possible tampering in an effort to disengage the respective members. Likewise, in all forms of the invention illustrated, only two separate pieces are employed, which may be relatively inexpensively manufactured to produce a very efficient permanent type of fastener.

Having thus described my invention, it is obvious that various immaterial modifications may be made in the same without departing from the spirit of my invention; hence, I do not wish to be understood as limiting myself to the exact form, construction, arrangement, and combination of parts herein shown and described or uses mentioned.

What I claim as new and desire to secure by Letters Patent is:

1. A seal for a strap member comprising a female member and an open ended cylindrical male member, each of said male and female members formed with an outwardly extending annular flange including prongs formed at the outer periphery of the annular flange and for affixing to the strap member, the female member having a tubular shell having an open end, an internal sleeve positioned in and integrally connected to said shell adjacent the opposite end thereof to form an annular space between said shell and sleeve, said space being closed adjacent said last-mentioned end, and opening on the open end of said shell, said male member having a tubular-shaped body of a size to enter the open end of said female member, with the inner end of said male member adapted to be positioned in said annular space, said body having a plurality of peripherally extending openings therein adjacent the inner end thereof, a plurality of resilient, spaced projections carried by said sleeve extending outwardly into said recess toward the closed end of the latter, said projections being adapted to spring into the openings in said body upon insertion of the latter into said recess, thereby interlocking said members together, and said male and female members are constructed and arranged and so proportioned that, as the ends of the strap member upon which the male and female members are adapted to be affixed are folded over in interlocked relationship and interlocked, the faces of the opposite ends of the strap are in substantial abutting relationship, whereby in the interlocked position, the prongs of the annular flanges are prevented from being tampered with.

2. A strap seal comprising a female member and an open ended cylindrical male member, the female member having a tubular shell, one end of which is open and terminates in an external, annular flange, a plurality of prongs extending from the outer periphery of said flange providing means for attaching said shell to a strap, and an internal sleeve positioned in said female member adjacent the opposite end thereof and secured to the latter to form an annular space between said member and sleeve, said space being closed adjacent said last-mentioned end and opening on the open end of said shell, said male member having a tubular-shaped body of a size adapted to enter the open end of said female member, with the inner end of said male member adapted to be positioned in said annular space, the outer end of said body terminating in an external, annular flange, a plurality of prongs extending from the outer periphery of said annular flange providing means for attaching said body to a strap, said body having a plurality of resilient, spaced projections extending inwardly and toward the outer end thereof, said sleeve having an annular shoulder adjacent its inner end extending outwardly into said recess, said projections being adapted to spring into overlying relation with respect to said shoulder upon insertion of said body into said recess, thereby interlocking said members together, and said male and female members are constructed and arranged and so proportioned that as the ends of the strap member upon which the male and female members are adapted to be affixed are folded over in interlocked relationship and interlocked, the faces of the opposite ends of the strap are in substantial abutting relationship.

3. A seal comprising a female member and an open ended cylindrical male member and a strap member, each of said male and female members formed with an outwardly extending annular flange including prongs formed at the outer periphery of the annular flange and for affixing to the strap member, the male and female members located on opposite sides of the strap member and extending in opposite directions when unlocked, the female member having a tubular shell, one end of which is open, and an internal sleeve positioned in said female member adjacent the opposite end thereof and secured to the shell to form an annular space between said shell and sleeve, said space being closed adjacent said last-mentioned end and opening on the open end of said shell, said male member having a tubular-shaped body of a size adapted to enter the open end of said female member, with the inner end of said male member adapted to be positioned in said annular space, said inner end terminating in an internal, peripheral flange, the inner end of said sleeve terminating in an external, peripheral flange extending into said recess and engageable with the flange on said body upon insertion of the latter into said recess for interlocking said members together, said male and female members are constructed and arranged and so proportioned that as the ends of the strap member upon which the male and female members are adapted to be affixed are folded over in interlocked relationship and interlocked, the faces of the opposite ends of the strap are in substantial abutting relationship, and with the male member extending through the strap into the female member when interlocked, whereby in the interlocked position, the prongs of the annular flanges are prevented from being tampered with.

4. As an article of manufacture an open ended cylindrical male member for a strap seal and a female member formed with an annular recess, said open ended cylindrical male member including a tubular-shaped body of a size adapted to enter the annular recess of said female member, with the inner end of said open ended cylindrical male member adapted to be positioned in said annular recess, the outer end of said body terminating in an external, annular flange, a plurality of prongs extending from the outer periphery of said annular flange providing means for attaching the tubular-shaped body to a strap member, and means carried by said tubular body adapted to engage means on said female member, whereby upon insertion of the male member within the recess of the female member said male and female members are constructed and arranged and so proportioned that as the ends of the strap member to which the male and female members are adapted to be affixed are folded over in interlocked relationship, the said members are adapted to be interlocked together with the faces of the opposite ends of the strap member in substantial abutting relationship.

5. As an article of manufacture, a female member for a strap seal and an open ended cylindrical male member having latching means, said female member including an outer portion and a reentrant inner portion defining an annular-shaped recess therebetween, the outer portion thereof terminating in an external, annular flange, a plurality of prongs extending from the outer periphery of said annular flange providing means for attaching the female member to a strap member, and means carried by the inner portion of said female member extending into the recess and complemental to the latching means of said male member, whereby upon affixing the female member to the male member said male and female members are constructed and arranged and so proportioned that as the ends of the strap member to which the male and female members are adapted to be affixed are folded over in interlocked relationship, the said members are adapted to be interlocked together with the faces of the opposite ends of the strap member in substantial abutting relationship.

6. A seal adapted to be affixed to a strap member and comprising a female member and an open ended cylindrical male member, said female member having an annular-shaped recess therein open at one end and formed with an annular outwardly extending flange, said open ended cylindrical male member having a portion of a size to enter and be positioned in said annular recess and formed with an outwardly extending annular flange, cooperating means on adjacent portions of said male member and said female member for interlocking the same together, said male and female members being complementally formed and so proportioned that as the ends of the strap member to which the male and female members are adapted to be affixed are folded over in interlocked relationship and are interlocked, the faces of the opposite ends of the strap are in substantial abutting relationship, and said outwardly extending annular flanges formed on each of the male and female members including prongs formed at the outer periphery thereof and adapted to be affixed to the strap, whereby in the interlocked position, the prongs of the annular flanges are prevented from being tampered with.

7. A strap seal comprising a strap member, a female member and an open ended cylindrical male member extending in opposite directions from the strap member, said female member having an annular-shaped recess therein open at one end and formed with an annular outwardly extending flange, said open ended cylindrical male member having a tubular-shaped portion of a size to enter and be positioned in said annular recess, said strap member formed with an opening complemental to the recess, a plurality of projections carried by one of said members engageable with a shoulder on the other member for interlocking the two members together, both said projections and said shoulder being positioned in said annular recess when the members are in interlocked positions, said male and female members being complementally formed and so proportioned that as the ends of the strap member upon which the male and female members are formed are folded over in interlocked relationship and interlocked, the faces of the opposite ends of the strap are in substantial abutting relationship, and said tubular portion of the male member adapted to extend through the opening in said strap member.

8. A seal for a strap member comprising a female member and an open ended cylindrical male member, each of said male and female members formed with an outwardly extending annular flange including prongs formed at the outer periphery of the annular flange and for affixing to the strap member, said female member having an outer portion and an inner portion defining an annular-shaped recess therebetween open at one end and closed at the opposite end and adapted to extend above one face of the strap member, said male member having a tubular-shaped portion of a size to enter and be positioned in said annular recess and adapted to extend above the other face of the strap member, an inwardly extending flange on the inner end of the tubular portion of said male member, and a plurality of projections on the inner end of the inner portion of said female member and extending into said recess, said inwardly extending flange being adapted to engage said projections upon insertion of the male member into said recess for interlocking said members together, said male and female members being complementally formed and so proportioned that as the ends of the strap member upon which the male and female members are adapted to be affixed are folded over in interlocked relationship and interlocked, the faces of the opposite ends of the strap are in substantial abutting relationship, and with the male member extending through the strap into the female member when interlocked, whereby in the interlocked position, the prongs of the annular flanges are prevented from being tampered with.

9. A seal for a strap member comprising a female member and an open ended cylindrical male member, each of said male and female members formed with an outwardly extending annular flange including prongs formed at the outer periphery of the annular flange and for affixing to the strap member, said female member having an outer portion and an inner portion defining an annular-shaped recess therebetween open at one end and closed at the opposite end and adapted to extend above one face of the strap member, said male member having a tubular-shaped portion of a size to enter and be positioned in said annular recess and adapted to extend above the other face of the strap member, a plurality of projections on the tubular portion of said male member, and a shoulder on the inner portion of said female member, said projections being adapted to engage said shoulder upon insertion of the male member into said recess for interlocking the members together, said male and female members being complementally formed and so proportioned that as the ends of the strap member upon which the male and female members are adapted to be affixed are folded over in interlocked relationship and interlocked, the faces of the opposite ends of the strap are in substantial abutting relationship, and with the male member extending through the strap into the female member when interlocked.

10. A seal for a strap member comprising a female member and an open ended cylindrical male member, each of said male and female members formed with an outwardly extending annular flange including prongs formed at the outer periphery of the annular flange and for affixing to the strap member, said female member having an outer portion and an inner portion defining an annular-shaped recess therebetween open at one end and closed at the opposite end and adapted to extend above one face of the strap member, said male member having a tubular-shaped portion of a size to enter and be positioned in said annular recess and adapted to extend above the other face of the strap member, a shoulder on the tubular portion of said male member, and a plurality of projections on the inner portion of said female member, said shoulder being adapted to engage said projections upon insertion of the male member into said recess for interlocking said members together, said male and female members being complementally formed and so proportioned that as the ends of the strap member upon which the male and female members are adapted to be affixed are folded over in interlocked relationship and interlocked, the faces of the opposite ends of the strap are in substantial abutting relationship, and with the male member extending through the strap into the female member when interlocked, whereby in the interlocked position, the prongs of the annular flanges are prevented from being tampered with.

ERNEST A. CONAWAY, Sr.

References Cited in the file of this patent

UNITED STATES PATENTS

| Number | Name | Date |
| --- | --- | --- |
| 1,582,444 | Bart | Apr. 27, 1926 |
| 1,605,638 | Baruch | Nov. 2, 1926 |
| 1,727,754 | Dessauer | Sept. 10, 1929 |
| 2,283,125 | Powell | May 15, 1942 |

FOREIGN PATENTS

| Number | Country | Date |
| --- | --- | --- |
| 396,933 | Germany | Dec. 1, 1924 |